United States Patent
Bierganns et al.

(10) Patent No.: US 10,443,192 B2
(45) Date of Patent: Oct. 15, 2019

(54) POWDERY WATER-SOLUBLE CATIONIC POLYMER COMPOSITION

(71) Applicant: Solenis Technologies, L.P., Schaffhausen (CH)

(72) Inventors: Patric Bierganns, Krefeld (DE); Markus Broecher, Mülheim an der Ruhr (DE)

(73) Assignee: SOLENIS TECHNOLOGIES, L.P., Schaffhausen (CH)

( * ) Notice: Subject to any disclaimer, the term of this patent is extended or adjusted under 35 U.S.C. 154(b) by 0 days.

(21) Appl. No.: 15/503,283

(22) PCT Filed: Aug. 26, 2015

(86) PCT No.: PCT/EP2015/069510
§ 371 (c)(1),
(2) Date: Feb. 10, 2017

(87) PCT Pub. No.: WO2016/030407
PCT Pub. Date: Mar. 3, 2016

(65) Prior Publication Data
US 2017/0226696 A1    Aug. 10, 2017

(30) Foreign Application Priority Data

Aug. 29, 2014 (EP) .................................... 14182775

(51) Int. Cl.
| | | |
|---|---|---|
| *C08L 39/00* | (2006.01) | |
| *C08L 33/00* | (2006.01) | |
| *C08F 8/30* | (2006.01) | |
| *D21H 17/37* | (2006.01) | |
| *C02F 1/56* | (2006.01) | |
| *D21H 17/44* | (2006.01) | |
| *D21H 17/45* | (2006.01) | |
| *D21H 17/46* | (2006.01) | |
| *D21H 17/56* | (2006.01) | |
| *D21H 21/10* | (2006.01) | |
| *B01D 21/01* | (2006.01) | |
| *C08J 3/12* | (2006.01) | |
| *C08L 33/26* | (2006.01) | |
| *C08F 283/00* | (2006.01) | |

(52) U.S. Cl.
CPC ........... *D21H 17/375* (2013.01); *B01D 21/01* (2013.01); *C02F 1/56* (2013.01); *C08F 283/00* (2013.01); *C08J 3/12* (2013.01); *C08L 33/00* (2013.01); *C08L 33/26* (2013.01); *C08L 39/00* (2013.01); *D21H 17/44* (2013.01); *D21H 17/45* (2013.01); *D21H 17/46* (2013.01); *D21H 17/56* (2013.01); *D21H 21/10* (2013.01); *C08J 2333/26* (2013.01); *C08J 2471/03* (2013.01); *C08L 2314/00* (2013.01)

(58) Field of Classification Search
USPC .......................... 524/555, 521, 527; 525/293
See application file for complete search history.

(56) References Cited

U.S. PATENT DOCUMENTS

| | | | |
|---|---|---|---|
| 4,857,610 A | 8/1989 | Chmelir et al. | |
| 6,031,037 A | 2/2000 | Ghafoor et al. | |
| 6,605,674 B1 | 8/2003 | Whipple et al. | |
| 7,335,709 B1 | 2/2008 | Brehm et al. | |
| 9,005,397 B2 | 4/2015 | Przybyla et al. | |
| 2002/0188040 A1* | 12/2002 | Chen ................... | A61K 8/8158 524/35 |
| 2007/0032677 A1 | 2/2007 | Herth et al. | |
| 2007/0173586 A1 | 7/2007 | Herth et al. | |

FOREIGN PATENT DOCUMENTS

| | | |
|---|---|---|
| CA | 2532953 A1 | 3/2005 |
| CN | 101094891 A | 12/2007 |
| CN | 103509180 A | 1/2014 |
| EP | 0262945 | 9/1987 |
| RU | 2292309 C1 | 1/2007 |
| RU | 2351614 C2 | 4/2009 |
| SU | 1085983 A1 | 4/1984 |
| SU | 1641405 A1 | 4/1991 |
| WO | 2006071181 A1 | 7/2006 |
| WO | 20130179139 | 12/2013 |

OTHER PUBLICATIONS

PCT/EP2015/069510, International Search Report, dated Nov. 19, 2015, pp. 1-2.
State Intellectual Property Office of the People's Republic of China, Office Action in Chinese Patent Application No. 201580046231.9 dated Dec. 29, 2017.
Russian Patent Office, Office Action issued in Application No. 2017 110 277, dated Feb. 22, 2019.

* cited by examiner

*Primary Examiner* — Tae H Yoon
(74) *Attorney, Agent, or Firm* — Lorenz & Kopf, LLP

(57) ABSTRACT

The invention relates to powdery, water-soluble, cationic polymer composition comprising at least two different cationic polymers, namely a first cationic polymer and a second cationic polymer, which differ in chemical nature and molecular weight, as well to a method for producing such powdery, water-soluble, cationic polymer composition, and to its use for promoting flocculation in solid-liquid separation, for example as a retention aid in paper manufacture, and in sludge dewatering/wastewater purification.

7 Claims, 6 Drawing Sheets

US 10,443,192 B2

POWDERY WATER-SOLUBLE CATIONIC POLYMER COMPOSITION

This application is a 371 National Stage Application, which claims the benefit of International Application No. PCT/EP2015/069510, filed on Aug. 26, 2015, which claims the benefit of European patent application number 14182775.8, filed 29 Aug. 2014, the entire contents of which are hereby incorporated by reference.

FIELD OF THE INVENTION

The invention relates to powdery, water-soluble, cationic polymer composition comprising at least two different cationic polymers, namely a first cationic polymer and a second cationic polymer, which differ in chemical nature and molecular weight, as well as to a method for producing such composition, and to its use for promoting flocculation in solid-liquid separation, for example as a retention aid in paper manufacture, and in sludge dewatering/wastewater purification. The cationic polymer composition according to the invention is characterized by a very low content of insolubles after being dispersed in water.

BACKGROUND OF THE INVENTION

Dewatering aids are employed in several solid/liquid separation applications including pulp & paper industry. In the practice of solid/liquid separation, flocculating auxiliaries are added in order to achieve the best possible result in terms of dry substance of the solid and clarity of the filtrate. In other words, it is the object to bring about the most complete separation possible of the solid phase from the liquid phase.

Flocculating auxiliaries are produced in the form of powdery granules or water-in-water or water-in-oil emulsions, and prior to their use are added in dilute aqueous solutions to the medium to be flocculated. Powdery granules can be advantageous, since they can be transported more inexpensively by virtue of their almost anhydrous condition and, as in the water-in-oil emulsions, do not contain any oil or solvent constituents that are insoluble in water.

The use of dry powder mixtures of different polymers in flocculation processes can lead to faulty proportioning as a result of phase-separation phenomena.

EP 262 945 A2 discloses cationic flocculation auxiliaries composed of two different polymer components and methods for their production. The auxiliaries are formed by polymerization of cationic monomers to a high molecular weight cationic polymer component (flocculent) in the presence of a low molecular weight cationic polymer component (coagulant). During this polymerization reaction, the polymer added first can undergo graft reactions. The ratio of coagulant to the high molecular weight cationic polymer component is specified as preferably 5:1 to 1:1.5. Such high proportions of coagulant, however, cause viscosity problems in the production of polymerization solutions. The properties of these flocculating agents do not satisfy the requirements of speed and effectiveness imposed on technical flocculation processes.

US2007/0032677 and US2007/0173586 disclose cationic polymer compositions showing good flocculation performance but possess high levels of insolubles after being dispersed in water. These insolubles can cause severe issues in the customer processes, like e.g. plugged filters, holes in the paper or breaks in the production.

WO 2013/179139 discloses compositions and methods of making paper products.

There is a demand of polymer compositions that overcome the drawbacks of the prior art.

Additional objects, advantages, and features of what is claimed will be set forth in the description that follows and in part will become apparent to those skilled in the art upon examination of the following or may be learned by the practice of the technology. The objects and advantages of the presently disclosed and claimed inventive concepts will be realized and attained by means of the compositions and methods particularly pointed out in the appended claims, including the functional equivalents thereof.

Each of the reference cited in the present application, including books, patents, published applications, journal articles and other publications, are incorporated herein by reference in their entirety.

SUMMARY OF THE INVENTION

Thus, it is an object of the invention to provide polymer compositions that are useful for promoting flocculation during solid/liquid separation and having advantages to conventional polymer compositions. It was another object of the invention to specify a production method by which two cationic polymers can be united with one another without substantial restrictions and the reaction products can be further processed without substantial restrictions, and wherein an intrinsically uniform and readily soluble polymer powder is formed. This object has been achieved by the subject-matter of the patent claims.

A first aspect of the invention relates to a powdery water-soluble cationic polymer composition comprising a first cationic polymer and a second cationic polymer; wherein the second cationic polymer is formed by non-radical polymerization; and wherein the first cationic polymer is formed in the presence of the second cationic polymer by radical adiabatic gel polymerization of an aqueous composition comprising a radically polymerizable cationic monomer, a radically polymerizable nonionic monomer, and the second cationic polymer.

It has been surprisingly found that the powdery cationic polymer compositions according to the invention have a low residual content of insolubles after dispersion in water thus rendering the compositions particularly useful for dewatering and drainage applications in paper manufacture.

DETAILED DESCRIPTION OF THE INVENTION

Figure 1:
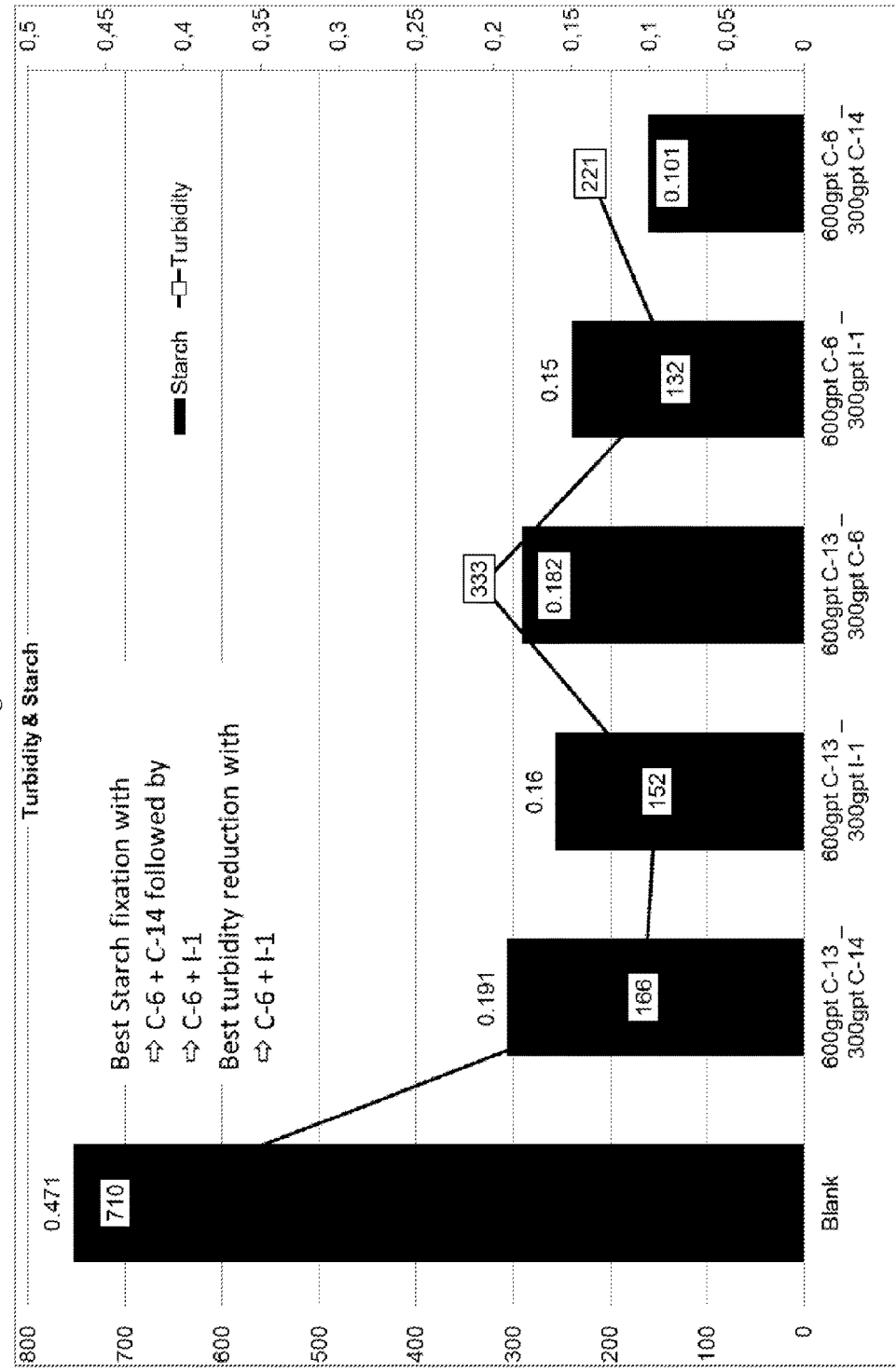
FIG. 1 shows experimental results for a comparison of the turbidity reduction and the starch fixation for a comparative combination of 600 gpt of comparative composition C-6 and 300 gpt of comparative composition C-14; for an inventive combination of 600 gpt of comparative composition C-6 and 300 gpt of inventive composition I-1; for a comparative combination of 600 gpt of comparative composition C-13 and 300 gpt of comparative composition C-6; for an inventive combination of 600 gpt of comparative composition C-13 and 300 gpt of inventive composition I-1; and for a comparative combination of 600 gpt of comparative composition C-13 and 300 gpt of comparative composition C-14 and blank. The best turbidity reductions can be observed for both inventive combinations containing inventive composition I-1. Both examples show good starch fixation. It has been surprisingly found that the inventive combinations containing inventive composition I-1 show improved drainage properties compared to the comparative combinations (see FIG. 2) without at the same time deteriorating starch fixation.

The present invention relates to powdery, water-soluble, cationic polymer composition comprising at least two different cationic polymers, namely a first cationic polymer and a second cationic polymer, which differ in chemical nature and molecular weight, as well as to a method for producing such composition, and to its use for promoting flocculation in solid-liquid separation, for example as a retention aid in paper manufacture, and in sludge dewatering/wastewater purification.

The relative weight ratio of the first cationic polymer to the second cationic polymer can be within the range of from about 99:1 to about 30:70, can be from about 97:3 to about 50:50, can be from about 95:5 to about 60:40, can be from about 90:10 to 65:35, and may be from about 65:35 to about 70:30 or from about 93:7 to about 87:13.

The first cationic polymer can have a lower charge density than the second cationic polymer.

The composition according to the invention contains 5 milliliter per liter (ml/l) or less insolubles, can be 4 ml/l or less, can be 3 ml/l or less, can be 2 ml/l or less and may be 1 ml/l or less when being dispersed in water. The content of residual insolubles is measured at room temperature in pure water after dispersing 1 gram (g) of the powdery cationic polymer composition in 999 g of pure water and stirring at 300 revolutions per minute (rpm) for 60 minutes.

When stirring is finished the solution is placed on a standard sieve (3154 m) and once it has passed through the sieve this is rinsed through five times with one liter of fresh water from the beaker. After the rinsing water has passed through the sieve, any residual water under the sieve is wiped off with a rubber policeman. Using the rubber policeman and a powder funnel the residue is transferred to a measuring cylinder and the volume determined.

According to the invention, the two cationic polymers differ in the method of their preparation. While the second cationic polymer is formed by non-radical polymerization, the first cationic polymer is formed by aqueous radical adiabatic gel polymerization. Because of this difference, the two cationic polymers typically also differ in their nature of cationic groups, which are of different composition, meaning that the first cationic polymer is formed from a cationic monomer species different from that of the second cationic polymer.

The second cationic polymer has a weight-average molecular weight lower than about 1 million grams per mole (g/mol); and/or can be a polyamine.

The amine groups of the polyamine can be either quaternized, not quaternized or partially quaternized.

The second cationic polymer can be a polyamine selected from the group consisting of polyethyleneimine, poly(dimethylamine(co)epichlorohydrin) and poly(dimethylamine-co-epichlorohydrin-co-ethylenediamine).

The second polymer can be formed by non-radical polymerization, i.e. may not be polyvinylamine.

In one embodiment, the second cationic polymer is a polyethyleneimine typically comprising the repetition unit —[CH2CH2NH]—. The polyethyleneimine can be substantially linear, i.e. substantially only contains secondary amine groups. However, it is also possible that the polyethyleneimine is branched to a certain extent, i.e. also containing primary and tertiary amine groups. Branched polyethyleneimine can be synthesized by the ring opening polymerization of aziridine. Depending on the reaction conditions different degrees of branching can be achieved. Linear polyethyleneimine is available by post-modification of other polymers like poly(2-oxazolines) or N-substituted polyaziridines. When the second cationic polymer is a polyethyleneimine, its cationicity is typically about 100 wt.-%, i.e. all monomer units that are incorporated into the polymer backbone are cationic monomer units.

In another embodiment, the cationic polymer can be a poly(epichlorohydrin-dimethylamines) typically comprising the repetition unit —[N$^+$(CH$_3$)$_2$CH$_2$CHOHCH$_2$]Cl$^-$—. Poly(epichlorohydrin-dimethylamines) obtainable by the reaction of dimethylamine with epichlorohydrin in a stoichiometric ratio.

In still another embodiment, the second cationic polymer can be a poly(dimethylamine-co-epichlorohydrin-co-ethylenediamine). Polymers of this type are obtainable by reacting dimethylamine, ethylenediamine and epichlorohydrin.

The second cationic polymer can have a lower molecular weight than the first cationic polymer. The weight-average molecular weight of the second polymer can be lower than about 1 million g/mol, and can be between about 50,000 g/mol and about 700,000 g/mol, and may be between about 100,000 g/mol and about 500,000 g/mol.

The first cationic polymer is a copolymer comprising cationic monomer units and nonionic monomer units.

In other embodiments according to the invention, the first cationic polymer has a weight-average molecular weight higher than about 1 million g/mol; and/or the content of cationic monomers in the aqueous composition is within the range of from about 5 wt.-% to about 90 wt.-%, relative to the total content of monomers; and/or the cationic monomer in the aqueous composition is selected from the group consisting of dimethylallylammonium chloride, cationized esters of (meth)acrylic acid containing a quaternized N atom, and cationized amides of (meth)acrylic acid containing a quaternized N atom; and/or the content of nonionic monomers in the aqueous composition is within the range of from about 10 wt.-% to about 95 wt.-%, relative to the total content of monomers; and/or the non-ionic monomer in the aqueous composition is (meth) acrylamide.

The cationic monomer in the aqueous composition can be selected from the group consisting of quaternized dimethylaminopropylacrylamide, quaternized dimethylaminoethyl acrylate and/or diallyldimethylammonium chloride.

For the purpose of the specification "(meth)acryl" in includes both, acryl as well as methacryl.

Examples of suitable radically polymerizable cationic monomers include but are not limited to cationized esters of (meth)acrylic acid, such as cationized dimethylaminoethyl (meth)-acrylate, cationized diethylaminoethyl(meth)acrylate, cationized diethylaminopropyl-(meth)acrylate, cationized dimethylaminopropyl(meth)acrylate, cationized dimethyl-aminobutyl(meth)acrylate, or cationized diethylaminobutyl(meth)acrylate; cationized amides of (meth) acrylic acid, such as cationized dimethylaminoethyl(meth)-acrylamide, cationized diethylaminoethyl(meth)acrylamide, cationized diethylamino-propyl(meth)acrylamide, cationized dimethylaminopropyl(meth)acrylamide, cationized dimethylaminobutyl(meth)acrylamide, or cationized diethylaminobutyl(meth)acrylamide; cationized N-alkylmonoamides and diamides with alkyl groups containing about 1 to 6 C atoms, such as cationized N-methyl(meth)acrylamide, cationized N,N-dimethyl-acrylamide, cationized N-ethyl (meth)acrylamide, cationized N-propyl(meth)acrylamide, cationized tert-butyl(meth)acrylamide, cationized N-vinylimidazoles such as vinyl-imidazoline, N-vinyl-2-methyl-imidazoline and N-vinyl-2-ethylimidazoline.

Quaternization can be effected with dimethyl sulfate, diethyl sulfate, methyl chloride, ethyl chloride or benzyl chloride. In another embodiment, the monomers quaternized with methyl chloride or benzyl chloride are employed.

Cationic monomers can be cationized esters and amides of (meth)acrylic acid, in each case containing a quaternized N atom. These can be quaternized dimethylaminopropyl acrylamide and quaternized dimethylaminoethyl acrylate.

Examples of suitable nonionic monomers, which are water-soluble, are acrylamide, methacrylamide, acrylonitrile, methacrylonitrile, N,N-dimethylacrylamide, vinylpyridine, vinyl acetate, hydroxy-group-containing esters of polymerizable acids the hydroxyethyl and hydroxypropyl esters of acrylic acid and methacrylic acid, further amino-group-containing esters and amides of polymerizable acids, such as the dialkylamino esters, for example dimethylamino and diethylamino esters of acrylic acid and methacrylic acid, a specific example being dimethylaminoethyl acrylate, as well as the corresponding amides, such as dimethylaminopropylacrylamide. Acrylamide is one such nonionic monomer. Monomers having limited solubility in water are used only to the extent that they do not impair the water solubility of the resulting copolymer.

The first cationic polymer has a comparatively high molecular weight. The weight-average molecular weight of the first cationic polymer can be at least about 1 million g/mol and may be at least about 3 million g/mol. The molecular weight of the first cationic polymer can be higher than that of the second cationic polymer. The high molecular weight of the first cationic polymer improves the effect of the inventive polymer composition in the flocculation process.

The charge density of the first cationic polymer can be freely selected in principle, and should be matched to the respective application. In one advantageous embodiment, the first cationic polymer is formed from about 5 wt.-% to about 90 wt.-%, and can be from about 20 wt.-% to about 50 wt.-% of cationic monomer units, relative to the total content of monomer units.

In another embodiment, the first cationic polymer can be formed from about 20±20 wt.-%, can be about 20±15 wt.-%, and may be about 20±10 wt.-% of cationic monomer units. In yet another embodiment, the first cationic polymer can be formed from about 30±20 wt.-%, can be about 30±15 wt.-%, and may be about 30±10 wt.-% of cationic monomer units, relative to the total content of monomer units. In another embodiment, the first cationic polymer can be formed from about 45±20 wt.-%, can be about 45±15 wt.-%, and may be about 45±10 wt.-% of cationic monomer units, relative to the total content of monomer units. In still another embodiment, the first cationic polymer can be formed from about 60±20 wt.-%, can be about 60±15 wt.-%, and may be about 60±10 wt.-% of cationic monomer units. In yet another embodiment, the first cationic polymer can be formed from about 75±20 wt.-%, can be about 75±15 wt.-%, and may be about 75±10 wt.-% of cationic monomer units, relative to the total content of monomer units.

In another embodiment, the first cationic polymer can be formed from at least about 26 wt.-% and can be from at least about 28 wt.-% of cationic monomer units. In another embodiment, the first cationic polymer can be formed from about 26 wt.-% and can be from about 24 wt.-% of cationic monomer units, relative to the total content of monomer units.

In another embodiment, the first cationic polymer can be formed from about 80±20 wt.-%, can be about 80±15 wt.-% and may be about 80±10 wt.-% of non-ionic monomer units, relative to the total content of monomer units. In still another embodiment, the first cationic polymer can be formed from about 70±20 wt.-%, can be about 70±15 wt.-% and may be about 70±10 wt.-% of non-ionic monomer units, relative to the total content of monomer units. In yet another embodiment, the first cationic polymer can be formed from about 50±20 wt.-%, can be about 50±15 wt.-% and may be about 50±10 wt.-% of non-ionic monomer units. In another embodiment, the first cationic polymer can be formed from about 10±5 wt.-%, relative to the total content of monomer units.

Another aspect of the invention relates to a method for producing the powdery cationic polymer composition according to any of the preceding claims, the method comprising the steps of preparing the aqueous composition comprising the radically polymerizable cationic monomer, the radically polymerizable nonionic monomer, and the second cationic polymer that is formed by non-radical polymerization; adjusting the temperature of the aqueous composition to a temperature within the range of from about −10° C. to about 25° C., and purging oxygen by an inert gas; starting radical adiabatic gel polymerization of the radically polymerizable cationic monomer and the radically polymerizable nonionic monomer in the presence of the second cationic polymer by adding a polymerization initiator; allowing the temperature of the aqueous composition to increase because of the exothermic polymerization reaction and to form a polymer gel while reaching the maximum polymerization temperature; and subjecting the polymer gel to mechanical size reduction and drying the polymer gel after the maximum temperature has been reached.

The inventive water-soluble, cationic polymer compositions can be produced by the method of adiabatic gel polymerization, wherein the first cationic polymer is formed by radical polymerization of its monomer constituents in aqueous solution in the presence of the second cationic polymer.

For the reaction, an aqueous solution of cationic and nonionic monomers and the second cationic polymer is first prepared, the start temperature for the polymerization is adjusted to a range of from about −10° C. to about 25° C., and oxygen is purged from the solution by an inert gas. The exothermic polymerization reaction of the monomers is started by addition of a polymerization initiator, and heating of the polymerization mixture takes place with formation of a polymer gel. After the temperature maximum has been reached, the solid polymer gel being formed can be further processed immediately or else after a holding time. The polymer gel can be further processed immediately after the maximum temperature has been reached.

In step b) the temperature can be adjusted to a temperature within the range of from about −5° C. to about 10° C.; and/or in step e) after size reduction, the aqueous polymer gel can be dried at a temperature within the range of from about 80° C. to about 120° C. to a moisture content of less than or equal to about 12.

Additionally, in step a) the overall concentration of the radically polymerizable cationic monomer, the radically polymerizable nonionic monomer, and the second cationic polymer in the aqueous composition can be within the range of from about 10 wt.-% to about 60 wt.-%, relative to the total weight of the aqueous composition.

The aqueous mixture of monomers and the second cationic polymer can be prepared at a concentration of about 10 wt.-% to about 60 wt.-%, can be about 15 wt.-% to about 50 wt.-% and may be about 25 wt.-% to about 45 wt.-%.

In one embodiment, the solution obtained during polymerization of the second cationic polymer can be used directly for production of the inventive products.

The start temperature for the polymerization reaction is adjusted to a range of about minus (−) 10° C. to about 25° C. and can be a range of about minus (−) 5° C. to about 10° C. Higher start temperatures lead to polymer gels which are too soft to be further processed in the subsequent size-reduction and drying processes.

The polymerization of the first cationic polymer is performed as an adiabatic polymerization, and it can be started either with a redox system or with a photoinitiator. Moreover, a combination of the two starting options is possible.

The redox initiator system comprises at least two components: An organic or inorganic oxidizing agent and an organic or inorganic reducing agent. For this purpose there are often used compounds with peroxide units, examples being inorganic peroxides such as alkali metal and ammonium persulfate, alkali metal and ammonium perphosphates, hydrogen peroxide and its salts (sodium peroxide, barium peroxide) or organic peroxides such as benzoyl peroxide, butyl hydroperoxide or per acids such as peracetic acid. Besides those, however, other oxidizing agents can also be used, such as potassium permanganate, sodium and potassium chlorate, potassium dichromate, etc. As reducing agents there can be used sulfur-containing compounds such as sulfites, thiosulfates, sulfinic acid, organic thiols (ethyl-mercaptan, 2-hydroxyethanethiol, 2-mercaptoethylammonium chloride, thioglycolic acid) and others. In addition, ascorbic acid and low-valency metal salts are possible [copper (I); manganese (II); iron (II)]. It is also entirely possible to use phosphorus compounds, such as sodium hypophosphite. In the case of photopolymerization, the reaction is started with UV light, which causes decomposition of the initiator. As examples, benzoin and benzoin derivatives, such as benzoin ether, benzyl and its derivatives, such as benzyl ketals, acryldiazonium salts, azo initiators such as 2,2'-azobis(isobutyronitrile), 2,2'-azobis(2-amidinopropane)hydrochloride or acetophenone derivatives can be used as initiators. The quantity of the oxidizing and reducing components ranges between about 0.00005 wt.-% and about 0.5 wt.-% and can be from about 0.001 wt.-% to about 0.1 wt.-%, and that of photoinitiators ranges between about 0.001 wt.-% and about 0.1 wt.-%, and can be about 0.002 wt.-% to about 0.05 wt.-%, relative to the monomer solution.

The polymerization is carried out in aqueous solution, in batches in a polymerization vessel or continuously on an endless belt. The process can be carried out at atmospheric pressure without external supply of heat, a maximum final temperature of about 50° C. to about 150° C., depending on the concentration of polymerizable substance, being reached due to the heat of polymerization.

According to this inventive polymerization procedure, there are obtained polymers with decisively better product properties than were measured for products according to EP 262945, which products were synthesized by isothermal polymerization.

After the end of polymerization, the polymer existing as a gel can be subjected to size reduction in standard industrial apparatus. The ratio of the second to the first cationic polymer is decisive for further processing of the polymer gel. If the ratio exceeds the value of about 0.01:10 to about 1:4, there are formed very soft gels, which immediately coalesce once again after size reduction and make drying on the industrial scale almost impossible. Polymers with cationic monomer proportions of greater than about 60 wt.-% are important as regards further processing. In those cases, it has often proved effective to adjust the ratio of the first to the second cationic polymer to about 0.2:10 to about <1:10.

After size reduction, the gel can be dried in batches in a circulating-air drying oven at about 70° C. to about 150° C., can be at about 80° C. to about 120° C. and may be at about 90° C. to about 110° C. In the continuous version, drying takes place in the same temperature ranges, for example on a belt dryer or in a fluidized-bed dryer. After drying, the product has a moisture content of less than or equal to about 12%, and can be less than or equal to about 10%.

After drying, the product can be ground to the desired particle-size fraction. In order to achieve rapid dissolution of the product, at least about 90 wt.-% of the product should have a size of smaller than about 2.0 millimeter (mm), and about 90 wt.-% can have a size of smaller than about 1.5 mm. Fine fractions smaller than about 0.1 mm should amount to less than about 10 wt.-% and can be less than about 5 wt.-%.

The inventive polymers are suitable as flocculation auxiliaries in the course of solid/liquid separation. In particular, they can be used suitably for purification of wastewater and for conditioning of potable water. Above and beyond this, they can be advantageously used as retention auxiliaries in flocculation processes during paper manufacture.

Another aspect of the invention relates to the use of the powdery water-soluble cationic polymer composition according to the invention for promoting flocculation during solid/liquid separation.

Another aspect of the invention relates to a method for promoting flocculation during solid/liquid separation, the method comprising the step of adding the polymer composition according to the invention to a mixture of solids and liquids.

In one embodiment, the solid/liquid separation is for purification of wastewaters and for conditioning of potable water.

In another embodiment, the solid/liquid separation can be during paper manufacture. In particular, the polymer compositions according to the invention are useful in all steps of paper manufacture, including initial dewatering, pressing and drying.

Another aspect of the invention relates to the use of the powdery water-soluble cationic polymer composition according to the invention in combination with an auxiliary composition for promoting flocculation during solid/liquid separation. The auxiliary composition according to the invention comprises a powdery water-soluble cationic polymer composition comprising a third cationic polymer, formed by radical polymerization, such as by adiabatic gel polymerization of an aqueous composition comprising a radically polymerizable cationic monomer and a radically polymerizable nonionic monomer; wherein the cationic monomer in the aqueous composition can be selected from the group consisting of quaternized dimethylaminopropylacrylamide and quaternized dimethyl-aminoethyl-acrylate; or a fourth cationic polymer and a fifth cationic polymer; wherein the fourth cationic polymer can be formed in the presence of the fifth cationic polymer by radical adiabatic gel polymerization of an aqueous composition comprising a radically polymerizable cationic monomer, a radically polymerizable nonionic monomer, and the fifth polymer. In another embodiment, the fifth cationic polymer can be a homopolymer comprising cationic or nonionic monomer units. The monomer units in the aqueous composition can be selected from the group consisting of quaternized dimethylaminopropylacrylamide and diallyldimethylammonium chloride.

In another embodiment, the combined use of the polymer composition according to the invention and of the auxiliary composition comprises employing an excess of the auxiliary composition. The relative weight ratio of the auxiliary composition to the polymer composition according to the invention can be at least about 1.2:1, can be at least about 1.5:1, and may be about 2:1.

Another aspect of the invention relates to a method for promoting flocculation during solid/liquid separation, the method comprising the step of adding the polymer composition according to the invention and an auxiliary composition to a mixture of solids and liquids.

All embodiments that have been defined above in relation to the powdery water-soluble cationic polymer composition according to the invention, its use and the method according to the invention also analogously apply to the combined use/method according to the invention and thus, are not repeated hereinafter.

The invention will be explained hereinafter on the basis of examples. These explanations are provided exclusively by way of example and are not to be construed as limiting the scope of the invention.

Example:

General Procedure for the Synthesis of Inventive Composition I-1 to Comparative Composition C-12

A polymerization vessel was charged with an aqueous acrylamide solution (43 wt.-%), which was then mixed with 0.25 g of a chelator. After the addition of water, the cationic monomer of the first cationic polymer and a solution of the second polymer, the pH value was adjusted to 5.0 with the addition of sulfuric acid (50 wt.-%) and formic acid. The solution was cooled to minus (−) 2° C. and degassed with nitrogen. Then, ABAH (2,2'-azobis(2-methylpropionamidine) dihydrochloride) was added and the polymerization was started under UV-light. Within 15 minutes, the reaction temperature raised from 0° C. to 90° C. The polymer was comminuted with a grinder and dried for 90 minutes at a temperature of 90° C. The product was ground to a grain fraction of less than (<) 1,250 μm.

Comparative examples C-13 and C-14 were also prepared according to the above general procedure. However, no second cationic polymer was added.

The exact composition of each example is shown in Table 1. Powdery cationic polymer compositions were manufactured from the following polymers and monomers, respectively:

TABLE 1

Composition of examples I1-C14., ADAME quat. = trimethylammonium methyl acrylate chloride, DIMAPA quat. = trimethylammonium propylacrylamide chloride

| | first cationic | | | | | second cationic | | |
| --- | --- | --- | --- | --- | --- | --- | --- | --- |
| | | cationic monomer | | non-ionic monomer | | | | |
| Ex. | total content | relative content | type | relative content | type | total content | type | Insolubles [ml/l] |
| I-1 | 90 wt.-% | 22 wt.-% | ADAME quat. | 78 wt.-% | acrylamide | 10 wt.-% | epichlorohydrin + dimethylamine | <1 |
| I-2 | 90 wt.-% | 22 wt.-% | ADAME quat. | 78 wt.-% | acrylamide | 10 wt.-% | epichlorohydrin + dimethylamine | 1 |
| I-3 | 90 wt.-% | 30 wt.-% | ADAME quat. | 70 wt.-% | acrylamide | 10 wt.-% | epichlorohydrin + dimethylamine | <1 |
| C-1 | 83 wt. | 50 wt.-% | DIMAPA quat. | 50 wt.-% | acrylamide | 17 wt.-% | polyDIMAPA quat. | 18 |
| C-2 | 83 wt. | 50 wt.-% | DIMAPA quat. | 50 wt.-% | acrylamide | 17 wt.-% | polyDIMAPA quat. | 20 |

TABLE 1-continued

Composition of examples I1-C14., ADAME quat. = trimethylammonium methyl acrylate chloride, DIMAPA quat. = trimethylammonium propylacrylamide chloride

| Ex. | first cationic total content | cationic monomer relative content | type | non-ionic monomer relative content | type | second cationic total content | type | Insolubles [ml/l] |
|---|---|---|---|---|---|---|---|---|
| C-3 | 81 wt.-% | 20 wt.-% | ADAME quat. | 80 wt.-% | acrylamide | 19 wt.-% | polyDADMAC | 5 |
| C-4 | 68 wt.-% | 20 wt.-% | ADAME quat. | 80 wt.-% | acrylamide | 32 wt.-% | polyDADMAC | >50 |
| C-5 | 59 wt.-% | 20 wt.-% | ADAME quat. | 80 wt.-% | acrylamide | 41 wt.-% | polyDADMAC | >50 |
| C-6 | 83 wt.-% | 50 wt.-% | DIMAPA quat. | 50 wt.-% | acrylamide | 17 wt.-% | polyDIMAPA quat. | ~18 |
| C-7 | 59 wt.-% | 20 wt.-% | ADAME quat. | 80 wt.-% | acrylamide | 41 wt.-% | polyDIMAPA quat. | 30 |
| C-8 | 90 wt.-% | 22 wt.-% | ADAME quat. | 78 wt.-% | acrylamide | 10 wt.-% | polyvinylamine 30% hydrolyzed | no product under various conditions |
| C-9 | 90 wt.-% | 22 wt.-% | ADAME quat. | 78 wt.-% | acrylamide | 10 wt.-% | Polyvinylamine 60% hydrolyzed | no product under various conditions |
| C-10 | 90 wt.-% | 22 wt.-% | ADAME quat. | 78 wt.-% | acrylamide | 10 wt.-% | polyvinylamine 100% hydrolyzed | no product under various conditions |
| C-11 | 90 wt.-% | 22 wt.-% | ADAME quat. | 78 wt.-% | acrylamide | 10 wt.-% | polyethyleneimine MW 25.000 g/mol | 90 |
| C-12 | 90 wt.-% | 22 wt.-% | ADAME quat. | 78 wt.-% | acrylamide | 10 wt.-% | polyethyleneimine MW 750.000 g/mol | 25 |
| C-13 | 100 wt.-% | 55 wt.-% | DIMAPA quat. | 45 wt.-% | acrylamide | — | — | — |
| C 14 | 100 wt.-% | 32 wt.-% | ADAME quat. | 68 wt.-% | acrylamide | — | — | — |

It becomes clear from the experimental data in the above table that the polymer compositions of Examples I-1, I-2 and I-3 according to the invention have a significantly lower content of insolubles compared with the comparative polymer compositions of Examples C-1, C-2, C-3, C-4, C-5 and C-6.

The dewatering and drainage performance of the polymer compositions according to the invention was investigated and compared with the dewatering performance of the comparative polymer compositions.

Figure 2:
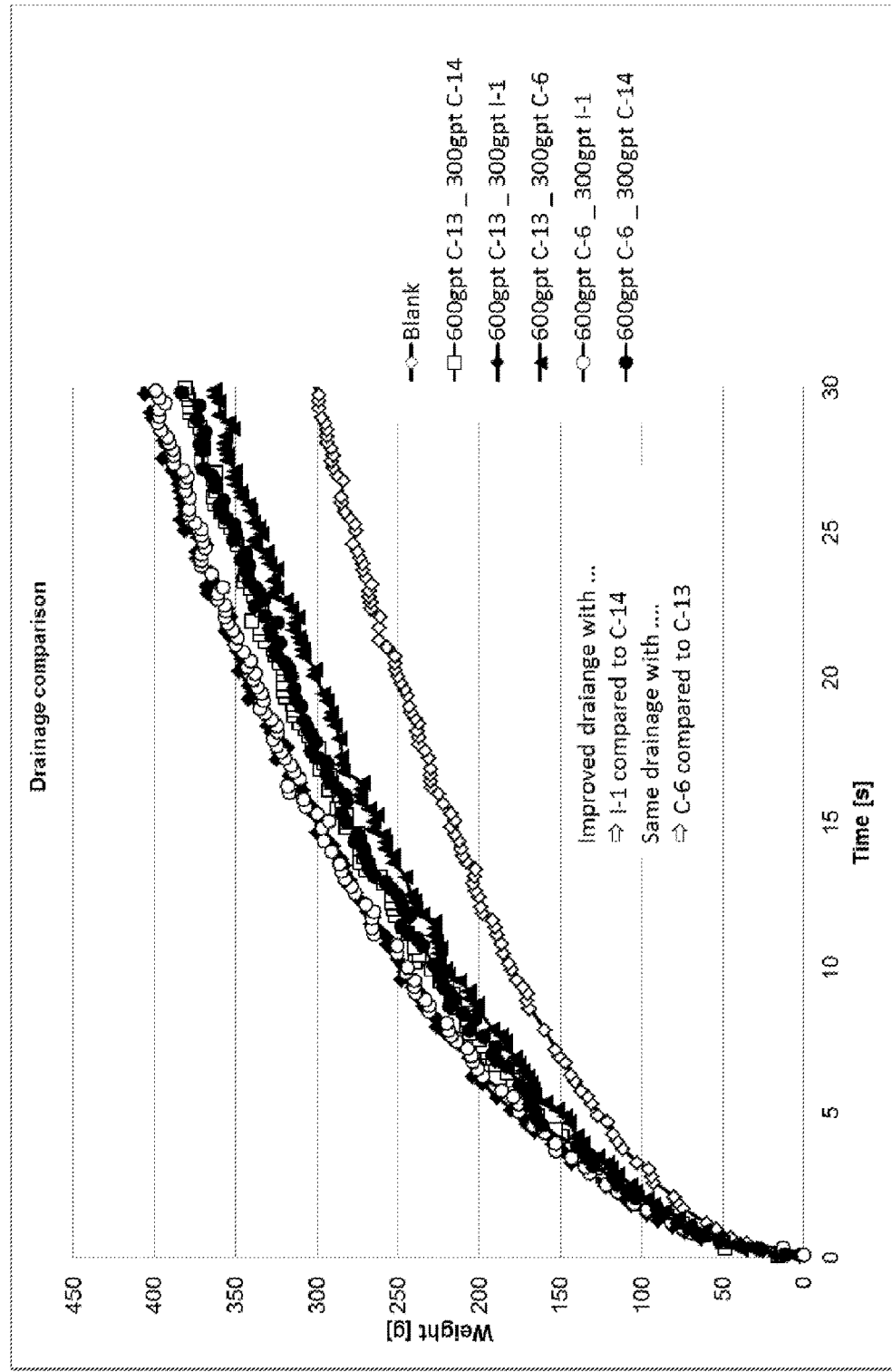
FIG. 2 shows experimental results for a drainage comparison of a comparative combination of 600 gpt of comparative composition C-13 and 300 gpt of comparative composition C-14; for an inventive combination of 600 gpt of comparative composition C-13 and 300 gpt of inventive composition I-1; for a comparative combination of 600 gpt of comparative composition C-13 and 300 gpt of comparative composition C-6; for an inventive combination of 600 gpt of comparative composition C-6 and 300 gpt of inventive composition I-1; for a comparative combination of 600 gpt of comparative composition C-6 and 300 gpt of comparative composition C-14; and blank. It becomes clear the combinations containing inventive composition I-1 show the best drainage.
Figure 3:
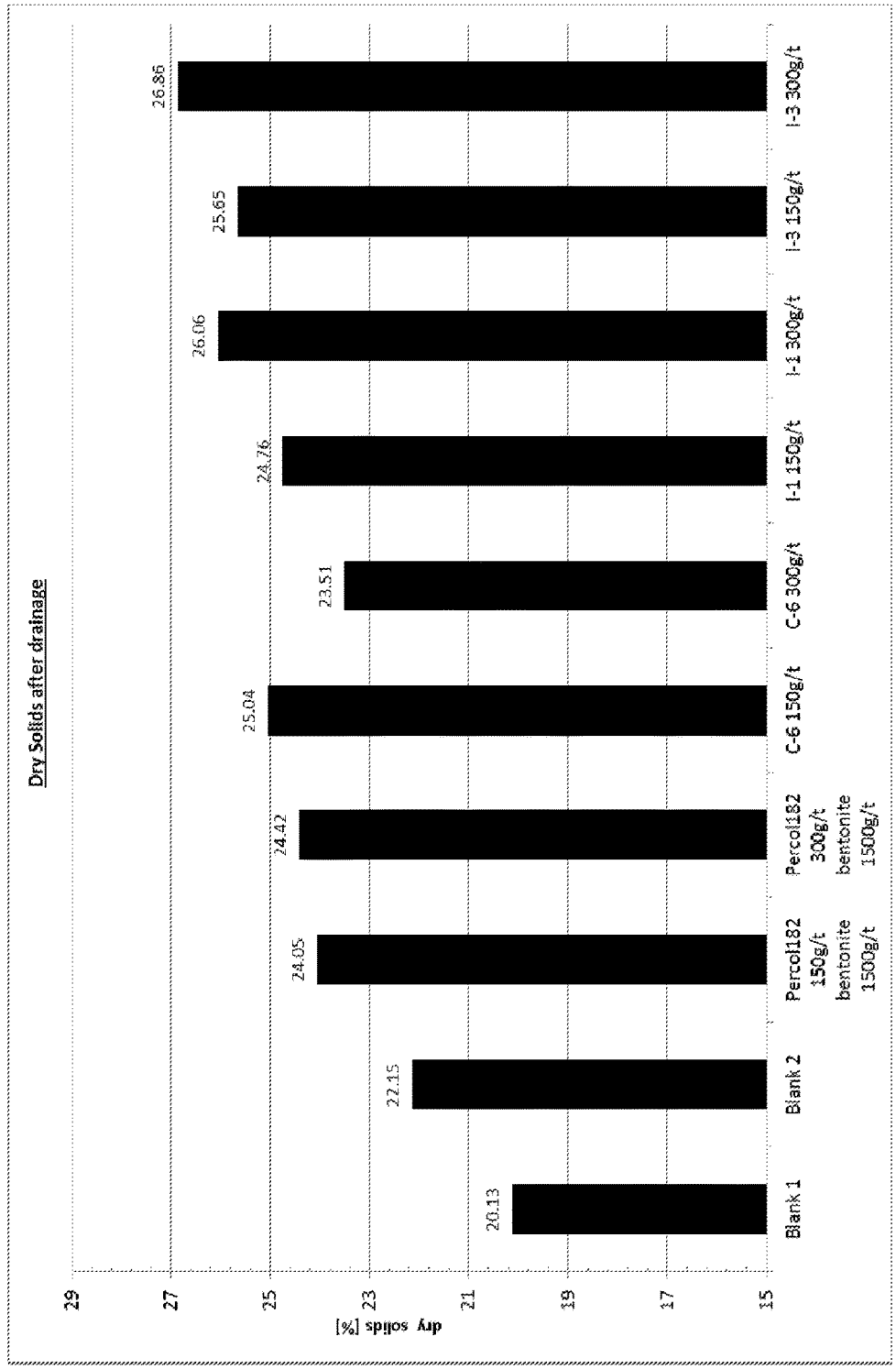
FIG. 3 shows experimental results concerning the percentage of dry solids after drainage, comparing inventive composition I-1, inventive composition I-3, comparative composition C-6, comparative composition Percol® 182/bentonite and blank. The best results, i.e. the highest percentage rates of dry solids, are obtained with inventive compositions I-1 and I-3.
Figure 4:
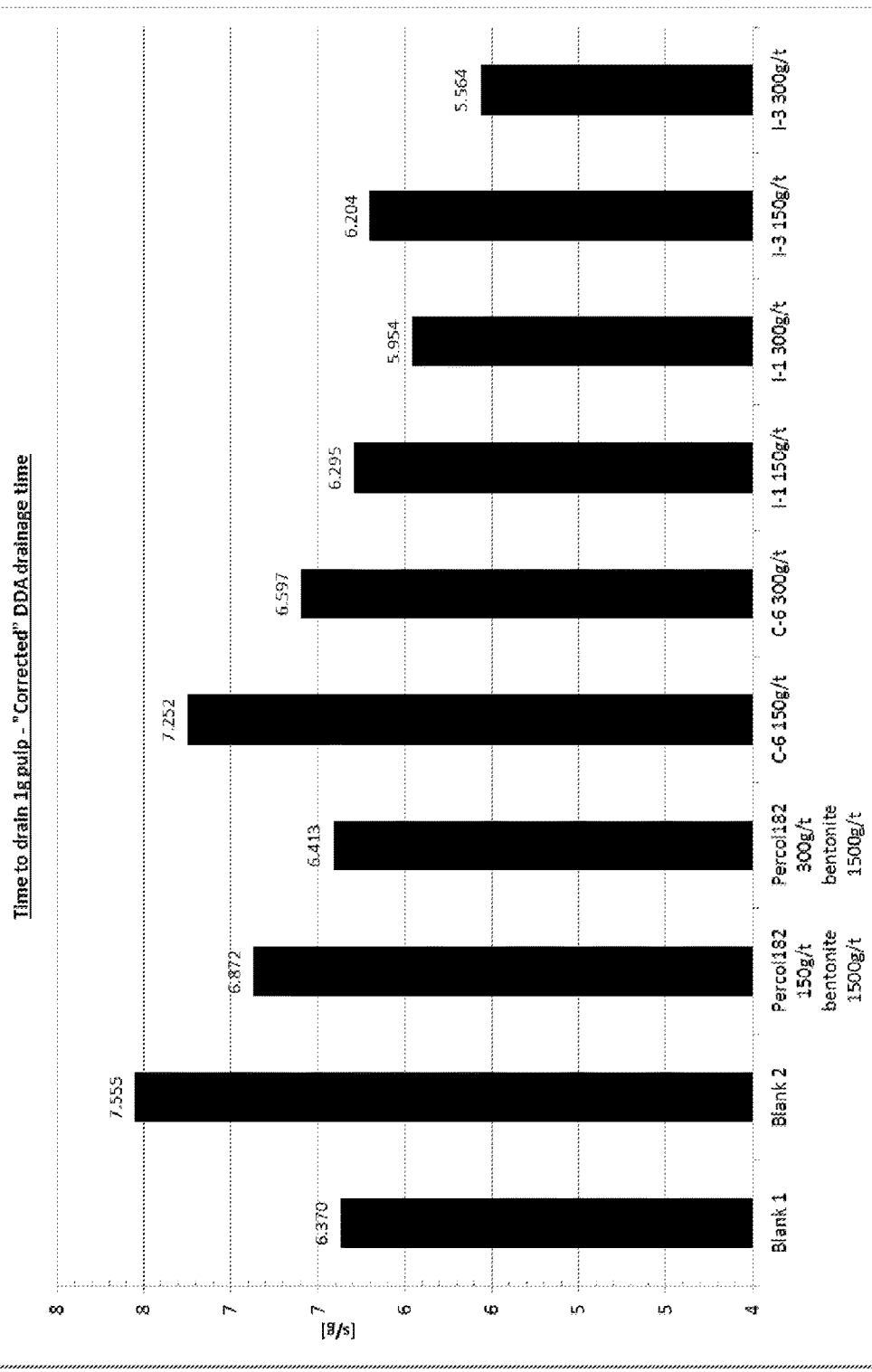
FIG. 4 shows experimental results for the time to drain 1 g pulp, comparing inventive composition I-1, inventive composition I-3, comparative composition C-6, comparative composition Percol® 182/bentonite and blank. The best results, i.e. the shortest time of draining, are obtained with inventive compositions I-1 and I-3.
Figure 5:
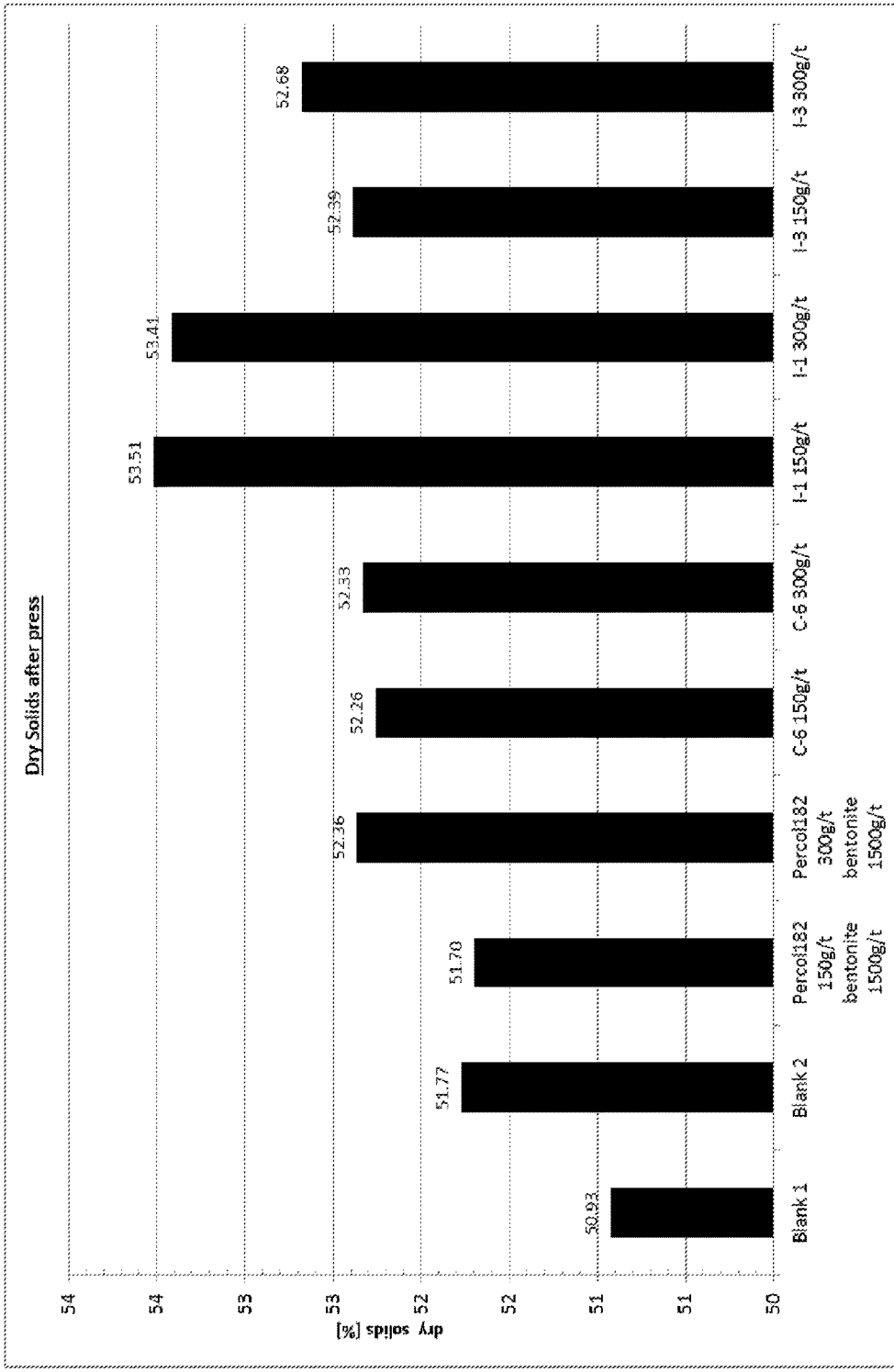
FIG. 5 shows experimental results concerning the percentage of dry solids after press, comparing inventive composition I-1, inventive composition I-3, comparative composition C-6, Percol® 182/bentonite and blank. The best results, i.e. the highest percentage rates of dry solids, are obtained by inventive composition I-1.
Figure 6:
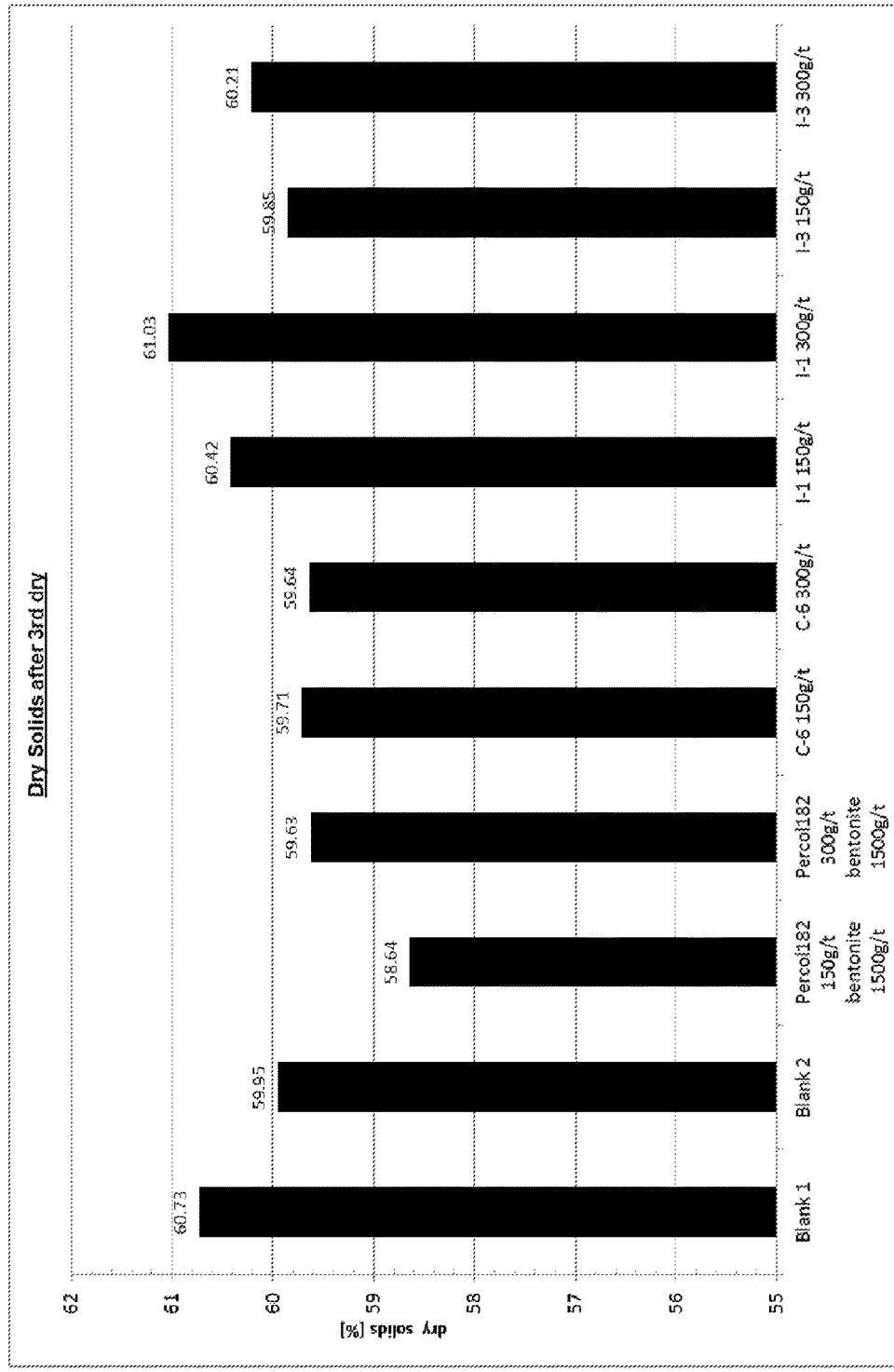
FIG. 6 shows experimental results concerning the percentage of dry solids after 3rd dry, comparing inventive composition I-1, inventive composition I-3, comparative composition C-6, comparative composition Percol® 182/bentonite and blank. The best results, i.e. the highest percentage rates of dry solids, were obtained by inventive composition I-1. The blank compositions also showed good results in this Figure. However, the inventive compositions I-1 and I-3 show the best results considering all three values of the dewatering process (i.e. initial drainage, see FIGS. 3 and 4; pressing, see FIG. 5; and drying, see FIG. 6), which is essential for an efficient process and makes the inventive compositions superior to the comparative examples and blank.

The experimental results are summarized in FIGS. 1 to 6.

FIGS. 3 to 6 show experimental results concerning a comparative example containing commercial product Percol® 182 and bentonite. Percol® 182 is a high molecular weight cationic polyacrylamide retention agent. Bentonite is an absorbent aluminium phyllosilicate, comprising montmorillonite.

The invention claimed is:

1. A powdery water-soluble cationic polymer composition comprising a first cationic polymer and a second cationic polymer;
   wherein the second cationic polymer is formed by non-radical polymerization;
   wherein the second cationic polymer has a weight-average molecular weight lower than 1 million g/mol;
   wherein the second cationic polymer is polyamine selected from the group consisting of poly(dimethylamine(co)epichlorohydrin) and poly(dimethylamine-co-epichlorohydrin-co-ethylene-diamine),
   wherein the first cationic polymer is formed in the presence of the second cationic polymer by radical adiabatic gel polymerization of an aqueous composition comprising a radically polymerizable cationic monomer, a radically polymerizable nonionic monomer, and the second cationic polymer, wherein the cationic monomer comprises 20 wt-%+/−15 wt-% of the monomer units of first cationic polymer and the nonionic monomer comprises 80 wt-%+/−15 wt-% of the monomer units of the first cationic polymer,
   wherein the weight ratio of the first cationic polymer to the second cationic polymer in the composition is within the range of from about 93:7 to about 87:13, and
   wherein 999 grams of water having 1 gram of the composition dispersed therein contains not more than 5 ml/l insoluble after stirring at 300 r.p.m. for 60 minutes.

2. The composition according to claim 1, wherein
   the first cationic polymer has a weight-average molecular weight higher than about 1 million g/mol; and/or
   the cationic monomer in the aqueous composition is selected from the group consisting of dimethylallylammonium chloride, cationized esters of (meth)acrylic acid containing a quaternized N atom, and cationized amides of (meth)acrylic acid containing a quaternized N atom; and/or
   the non-ionic monomer in the aqueous composition is (meth) acrylamide; and
   the composition contains not more than 4 ml/l insoluble when being dispersed in the water and after the stirring.

3. The composition according to claim 1, wherein the cationic monomer in the aqueous composition is selected from the group consisting of quaternized dimethylaminopropylacrylamide, quaternized dimethylaminoethyl acrylate and/or diallyldimethylammonium chloride.

4. The composition according to claim 1, wherein the first cationic polymer has a lower charge density than the second cationic polymer.

5. A powdery water-soluble cationic polymer composition comprising a first cationic polymer and a second cationic polymer;
   wherein the second cationic polymer is formed by non-radical polymerization;
   wherein the second cationic polymer has a weight-average molecular weight lower than 1 million g/mol;
   wherein the second cationic polymer is polyamine selected from the group consisting of poly(dimethylamine(co)epichlorhydrin) and poly(dimethylamine-co-epichlorohydrin-co-ethylene-diamine), and wherein the first cationic polymer is formed in the presence of the second cationic polymer by radical adiabatic gel polymerization of an aqueous composition comprising a radically polymerizable cationic monomer, a radically polymerizable nonionic monomer, and the second cationic polymer, wherein the cationic monomer comprises 20 wt-%+/−10 wt-% of the monomer units of first cationic polymer and the nonionic monomer comprises 80 wt-%+/−10 wt-% of the monomer units of the first cationic polymer, wherein the weight ratio of the first cationic polymer to the second cationic polymer in the composition is within the range of from about 93:7 to about 87:13, and wherein 999 grams of water having 1 gram of the composition dispersed therein contains not more than 3 ml/l insoluble after stirring at 300 r.p.m. for 60 minutes.

6. The powdery water-soluble cationic polymer composition of claim 5, wherein the composition contains not more than 2 ml/ insoluble when being dispersed in the water and after the stirring.

7. The powdery water-soluble cationic polymer composition of claim 5, wherein the composition contains not more than 1 ml/l insoluble when being dispersed in the water and after the stirring.

* * * * *